United States Patent
Inami et al.

(10) Patent No.: US 8,624,775 B2
(45) Date of Patent: Jan. 7, 2014

(54) RADAR APPARATUS AND ANTENNA DEVICE

(75) Inventors: Kazuyoshi Inami, Tokyo (JP); Takamasa Ando, Gifu (JP)

(73) Assignees: Mitsubishi Electric Corporation, Tokyo (JP); Denso Corporation, Kariya-shi (JP)

( * ) Notice: Subject to any disclaimer, the term of this patent is extended or adjusted under 35 U.S.C. 154(b) by 266 days.

(21) Appl. No.: 13/265,890

(22) PCT Filed: Mar. 17, 2010

(86) PCT No.: PCT/JP2010/054599
§ 371 (c)(1),
(2), (4) Date: Oct. 24, 2011

(87) PCT Pub. No.: WO2010/122860
PCT Pub. Date: Oct. 28, 2010

(65) Prior Publication Data
US 2012/0050091 A1    Mar. 1, 2012

(30) Foreign Application Priority Data
Apr. 23, 2009   (JP) .................... 2009-105590

(51) Int. Cl.
*G01S 13/42* (2006.01)
(52) U.S. Cl.
USPC ............ 342/107; 342/115; 342/175; 342/192
(58) Field of Classification Search
USPC ........ 342/107, 111, 115–116, 135, 139–140, 342/146, 159, 162, 175, 192
See application file for complete search history.

(56) References Cited

U.S. PATENT DOCUMENTS 3,032,758 A * 5/1962 Stavis .................... 342/113
6,067,040 A * 5/2000 Puglia .................... 342/134
(Continued)

FOREIGN PATENT DOCUMENTS

CN    1188995 A    7/1998
CN    1573356 A    2/2005
(Continued)

OTHER PUBLICATIONS

Office Action issued Nov. 28, 2012 in Chinese Application No. 201080018340.7.
(Continued)

*Primary Examiner* — John B Sotomayor
(74) *Attorney, Agent, or Firm* — Oblon, Spivak, McClelland, Maier & Neustadt, L.L.P.

(57) ABSTRACT

Four rows on one side of linear arrays arranged at equal intervals in the vertical direction and arranged at a predetermined interval in the horizontal direction form transmission channels and remaining twelve rows form a reception channel group. Among the remaining twelve rows, linear arrays of four rows in the center form a reception-first-array with each row set as a channel unit. Linear arrays of eight rows on both sides form a reception-second-array with two rows set as a channel unit. In wide-angle-middle-detection-processing, signals are combined using the reception-first-array. In long-detection-processing, signals are combined using the reception-second-array. Second null of a radiation pattern by a transmission array and first null of the reception-second-array are matched. The first null of the transmission array is filled such that a gain difference between the first null and a first side lobe of the transmission array is within a predetermined value.

25 Claims, 9 Drawing Sheets

(56) References Cited

U.S. PATENT DOCUMENTS

| | | | |
|---|---|---|---|
| 8,149,158 B2* | 4/2012 | Samukawa et al. ............. | 342/70 |
| 2005/0069277 A1 | 3/2005 | Nakazawa et al. | |
| 2005/0128132 A1 | 6/2005 | Ziller et al. | |
| 2011/0163919 A1 | 7/2011 | Suzuki | |
| 2012/0050091 A1* | 3/2012 | Inami et al. ................... | 342/107 |

FOREIGN PATENT DOCUMENTS

| | | |
|---|---|---|
| JP | 2 287181 | 11/1990 |
| JP | 8 181537 | 7/1996 |
| JP | 8 334557 | 12/1996 |
| JP | 2000 258524 | 9/2000 |
| JP | 2003-248055 | 9/2003 |
| JP | 3511329 B2 | 3/2004 |
| JP | 2008-53953 | 3/2008 |
| JP | 2008-252207 | 10/2008 |
| WO | 03 040754 | 5/2003 |
| WO | WO 2010/026990 A1 | 3/2010 |

OTHER PUBLICATIONS

International Search Report Issued Apr. 20, 2010 in PCT/JP10/054599 filed Mar. 17, 2010.

* cited by examiner

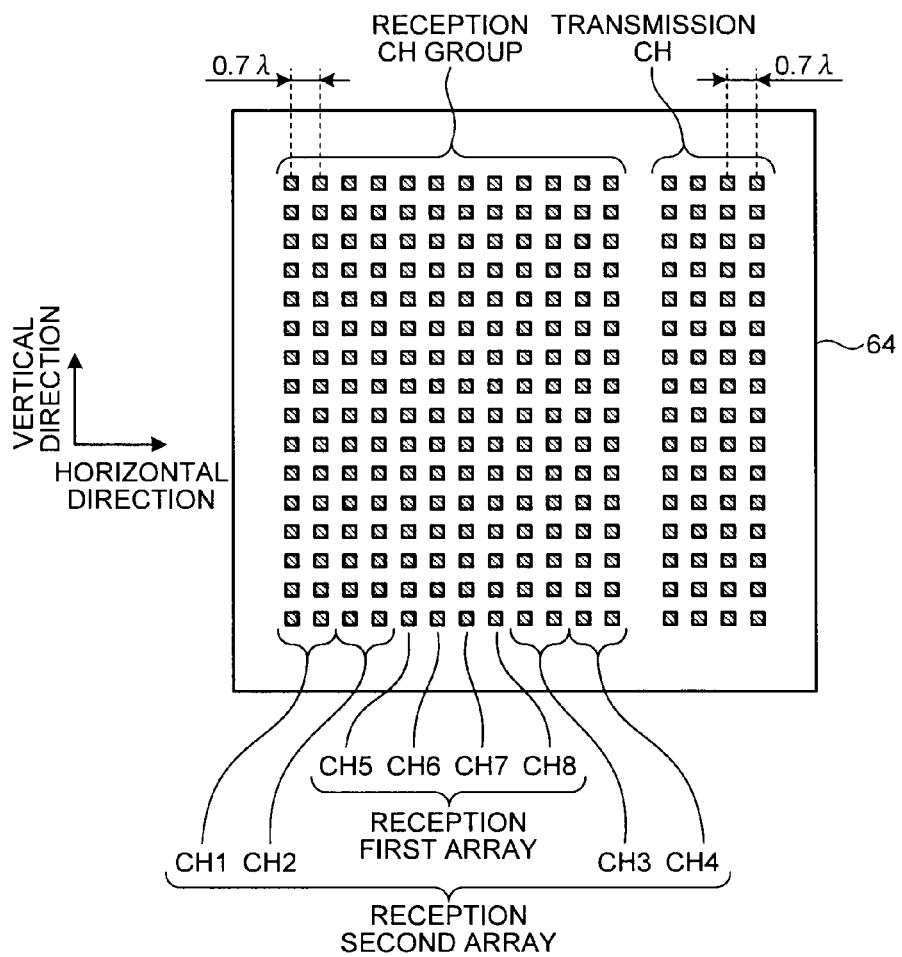
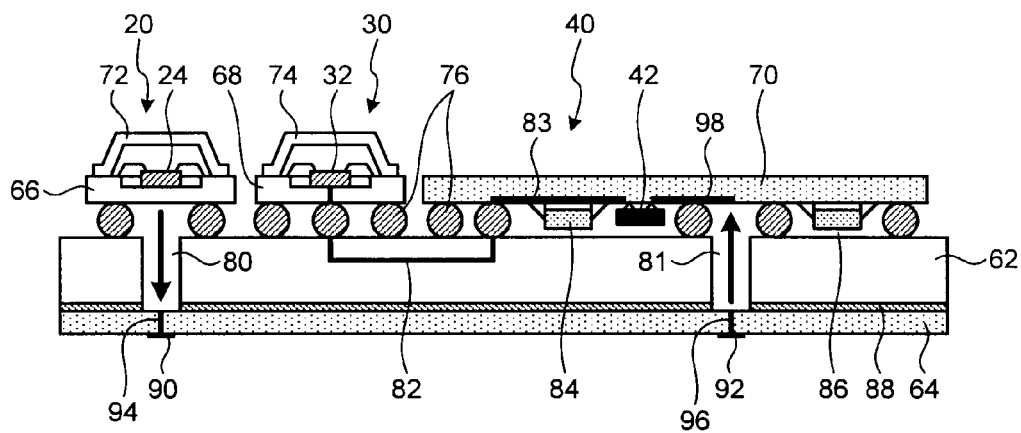

FIG.7
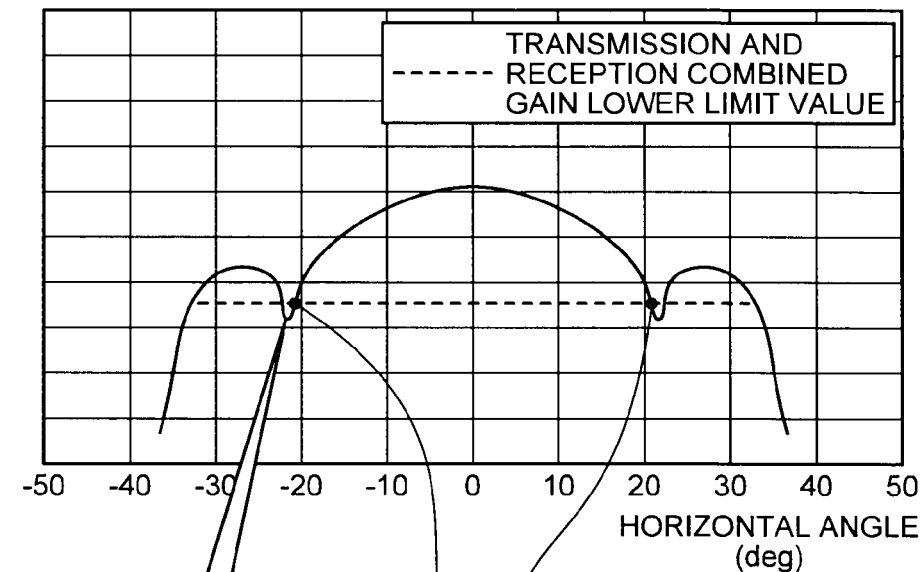
(a)
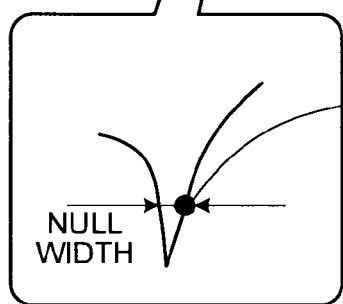
(b)
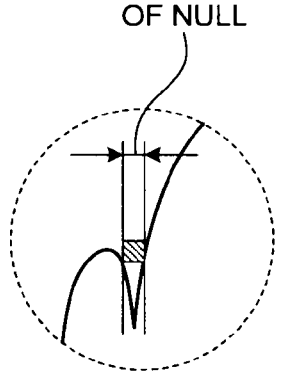

EXPANSION OF FREQUENCY MODULATION WIDTH:
INCREASE FREQUENCY RESOLUTION AND REDUCE NOISE

NARROWING OF FILTER BAND
PERFORM FILTERING IN NECESSARY AREA AND REMOVE
HIGH-FREQUENCY NOISE COMPONENT

RADAR APPARATUS AND ANTENNA DEVICE

FIELD

The present invention relates to a radar apparatus that detects at least a direction in which a target is present and an antenna device suitably used in the radar apparatus.

BACKGROUND

In the past, a radar apparatus that transmits and receives a continuous wave (a radar wave) to detect a target is mounted on an automobile. In the radar apparatus of this type (a vehicle-mounted radar apparatus), to detect a direction in which a target (e.g., a roadside object such as a guardrail or a leading vehicle) is present and accurately specify a position of the target, an array antenna configured by arranging a plurality of antenna elements at equal intervals specified in advance is used as a reception antenna (see, for example, Patent Literature 1).

CITATION LIST

Patent Literature

Patent Literature 1: Japanese Patent Application Laid-open No. H08-181537

SUMMARY

Technical Problem

Compared with a distance to a vehicle, which is one of detection targets, the traveling speed of the vehicle is high. Therefore, the vehicle-mounted radar apparatus needs to detect the direction of a target present in a position away from the vehicle (e.g., about 100 meters to 200 meters). The antenna elements are arranged to make it possible to narrow down beam width, i.e., sharpen a main lobe of the array antenna.

Therefore, in a general vehicle-mounted radar apparatus, an angle range where a direction in which a target is present can be detected is narrowed (although this angle range is narrow, a detection area in which a target present in a position away from a vehicle can be detected is hereinafter referred to as "normal detection area"). It is difficult to detect at an early stage another vehicle that cuts in front of the own vehicle from a side.

Specifically, the conventional vehicle-mounted radar apparatus is required to have an ability for detecting, while maintaining a state in which a target present in a position away from a vehicle can be detected (i.e., while maintaining a detection ability in the normal detection area), the direction of the target in a wider angle range (hereinafter referred to as "wide angle range").

Therefore, to enable detection of a direction in the wide angle range in addition to the normal direction area, for example, it is conceivable to adopt a method of using a reception antenna including a first array antenna in which a plurality of antenna elements are arranged at a first arrangement interval and a second array antenna in which a plurality of antenna elements are arranged at a second arrangement interval set narrower than the first arrangement interval. Actually, if this method is used, it is possible to detect a direction in the wide angle range in addition to the normal detection area.

However, in this method, there is a problem in that the area of the reception antenna is large and cost increases. In particular, in the vehicle-mounted radar apparatus, limitation on a setting place are extremely large. Therefore, it is difficult to increase the area of the reception antenna.

The present invention has been devised in view of the above and it is an object of the present invention to provide a radar apparatus that can detect, in a wider angle range in addition to the normal detection area, a direction in which a target is present without increasing the area of the reception antenna and an antenna device that can be applied to the radar apparatus.

Solution to Problem

In order to solve above-mentioned problems and to achieve the object, a radar apparatus according to the present invention includes a transmitting unit that generates a probe wave including a continuous wave, an antenna unit including a transmission antenna that radiates the probe wave to a space and a reception antenna that receives a reflected wave from a target of the probe wave, a receiving unit that outputs a signal obtained by down-converting a reception signal from the reception antenna into a predetermined frequency band, and a signal processing unit that applies a predetermined frequency analysis to the signal output from the receiving unit and outputs information concerning one or more of a distance to the target, a relative speed to the target, and a direction in which the target is present, wherein when a detection area of the target is classified into a first detection area that is an area at a distance closer than a set distance set in advance and at an angle wider than a set angle set in advance and a second detection area that is an area at a distance farther than the set distance and on an inner side of the set angle, the reception antenna includes a plurality of antennas for reception as array antennas and, in the reception antenna, a reception first array that probes the first detection area using a predetermined number of antennas adjacent to one another among the plurality of antennas for reception and a reception second array that probes the second detection area using all the antennas are configured, the transmission antenna is shared as an antenna for probe of the first and second detection areas, second null of a radiation pattern by the transmission antenna and first null of a reception pattern by the reception second array are substantially matched, and a level difference between a first side lobe of the radiation pattern of the transmission antenna and first null of the radiation pattern is within a predetermined value.

Advantageous Effects of Invention

With the radar apparatus according to the present invention, there is an effect that it is possible to provide a radar apparatus that can detect, in a wider angle range in addition to the normal detection area, a direction in which a target is present without increasing the area of the reception antenna.

BRIEF DESCRIPTION OF DRAWINGS

FIG. 2 is a diagram of the overview of an antenna board in the radar apparatus according to the embodiment.

FIG. 3 is a schematic diagram of a sectional structure of the radar apparatus according to the embodiment.

FIG. 7 is a diagram for explaining a transmission and reception combined gain lower limit value, null width, and minimum width of null.

DESCRIPTION OF EMBODIMENTS

An embodiment of a radar apparatus and an antenna device according to the present invention is explained in detail below with reference to the accompanying drawings. The present invention is not limited by the embodiment explained below.

Embodiment

Figure 1:
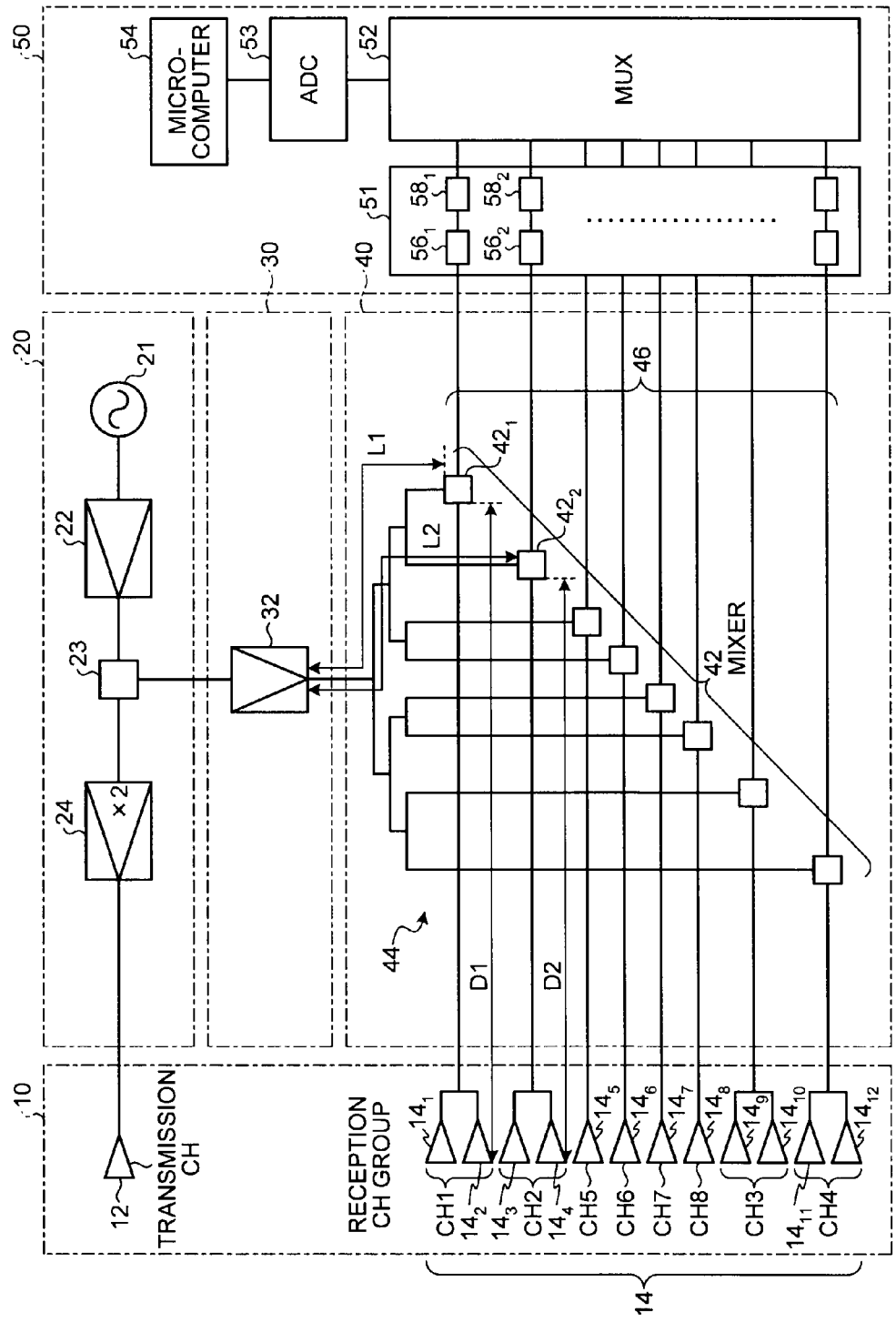
FIG. 1 is a block diagram of a functional configuration of a radar apparatus according to an embodiment of the present invention.

FIG. 1 is a block diagram of a functional configuration of a radar apparatus according to an embodiment of the present invention. In FIG. 1, the radar apparatus according to this embodiment is a radar apparatus of an FM-CW system and includes an antenna unit 10, a transmitting unit 20, a local signal (hereinafter referred to as "LO signal") amplifying unit 30, a receiving unit 40, and a signal processing unit 50. The transmitting unit 20, the LO-signal amplifying unit 30, and the receiving unit 40 configure a transmission and reception circuit unit. The antenna unit 10 is arranged in a pre-stage section of this transmission and reception circuit. The signal processing unit 50 is arranged in a post-stage section of the transmission and reception circuit unit.

Details of the components of the radar apparatus shown in FIG. 1 are explained. In FIG. 1, the antenna unit 10 includes a transmission antenna 12 that forms a transmission channel (CH) of an antenna system and a reception antenna 14 that forms a reception channel group (CH1, CH2, . . . , and CH8) of the antenna system. The reception channel CH1 is formed by antennas $14_1$ and $14_2$, the reception channel CH2 is formed by antennas $14_3$ and $14_4$, the reception channel CH3 is formed by antennas $14_9$ and $14_{10}$, and the reception channel CH4 is formed by antennas $14_{11}$ and $14_{12}$. On the other hand, the reception channels CH5 to CH8 are respectively formed by antennas $14_5$ to $14_8$. However, the configuration of the antenna unit 10 shown in FIG. 1 shows only an example of the configuration and is not limited to those components. In FIG. 1, each of the transmission antenna 12 and the antennas $14_1$ to $14_{12}$ included in the reception antenna 14 does not need to be a single antenna and can be an array antenna including a plurality of antenna elements.

The transmitting unit 20 includes an oscillator 21 that outputs a predetermined modulation signal necessary for the radar apparatus, an amplifier 22 that amplifies the output of the oscillator 21, a distributor 23 that distributes an output of the amplifier 22, and an amplifier 24 that has an output terminal connected to the transmission antenna 12 and amplifies an output of the distributor 23. The amplifier 24 is, for example, a high-frequency amplifier (in FIG. 1, a multiplying-by-two amplifier is shown) having a frequency multiplying function. If the high-frequency amplifier having the frequency multiplying function is used, a design frequency of the transmission and reception circuit unit can be reduced to, for example, a half (in the case of the multiplying-by-two amplifier) with respect to the frequency of a probe wave (hereinafter referred to as "radar wave") radiated to the space through the transmission antenna 12. Therefore, there is an advantage that it is easy to design the transmission and reception circuit unit.

The LO-signal amplifying unit 30 includes an amplifier 32 that amplifies an LO signal supplied via the distributor 23 of the transmitting unit 20.

The receiving unit 40 includes a mixer 42 that is connected to the reception antenna 14 and down-converts a reception signal of the reception antenna 14 based on the LO signal input via the distributor 23 of the transmitting unit 20. The mixer 42 is configured to be provided for each of the reception channels. The receiving unit 40 also includes an LO-signal distribution circuit 44, which is a supply (distribution) circuit for an LO signal to the mixer 42. An arrangement position of the mixer 42 on signal lines 46 that connect the antenna unit 10 and the signal processing unit 50 is adjusted to set supply path length for the LO signal to the mixer 42 (the LO signal is equivalent to L1, L2, . . . ) and supply path length for an RF signal to the mixer 42 (the RF signal is equivalent to D1, D2, . . . ) to an equal distance among the reception channels (hereinafter referred to as "line length equalization for the reception channels" when necessary).

The concept of the line length equalization for the reception channels is explained. As shown in FIG. 1, signal electric lengths between mixers $42_1$ and $42_2$ and the amplifier 32 of the LO-signal amplifying unit 30 are respectively represented as L1 and L2 and signal electric lengths between mixers $42_1$ and $42_2$ and reception antennas corresponding to the reception channels CH1 and CH2 are respectively represented as D1 and D2. The mixers $42_1$ and $42_2$ are arranged to satisfy a relation of "L1=L2" with respect to the LO signal and satisfy a relation of "D1=D2" with respect to the RF signal. The same holds true concerning the other mixers. If the mixers are arranged based on such a concept of the line length equalization, it is possible to reduce a gain deviation and an amplitude deviation among the channels.

In FIG. 1, the signal lines 46 that transmit signals from the reception channels CH5 to CH8 are arranged in the center. The signal lines 46 that transmit signals from the reception channels CH1 and CH2 and the reception channels CH3 and CH4 are arranged on both sides. However, the signal lines 46 are not always limited to this configuration. However, when the signal lines 46 are configured as shown in the figure, the reception channels CH1 and CH2 and the reception channels CH3 and CH4 are symmetrically formed and, on the other hand, a phase relation concerning reception signals is opposite with respect to the reception channels CH5 to CH8. Therefore, when signals of the reception channels CH1 and CH2 and the reception channels CH3 and CH4 leak into the reception channels CH5 to CH8, the reception channels act to cancel the leak signals. Therefore, as shown in the figure, it is desirable to arrange the reception channels CH5 to CH8 in the center and arrange the reception channels CH1 and CH2 and the reception channels CH 3 and CH4 on both the sides.

The signal processing unit 50 includes a video amplifier (AMP) 51 that is connected to the mixer 42 and amplifies a signal after down-convert, a multiplexer (MUX) 52 that sequentially switches signals corresponding to the reception channels passed through the video amplifier 51 and outputs the signals to an AD converter 53, the AD converter (ADC) 53 that analog-digital converts an output of the multiplexer 52, and a microcomputer 54 that generates, based on an output of the AD converter 53, one or more kinds of information concerning a target and outputs the information. The video amplifier 51 includes amplification circuits 56 ($56_1$, $56_2$, . . . ) that amplify signals down-converted by the mixer 42 and filters 58 ($58_1$, $58_2$, . . . ) that apply band width limitation to output signals of the amplification circuits 56 and output the signals to the multiplexer 52. The microcomputer 54 includes, in addition to basic elements such as a ROM, a RAM, and a CPU, processing means (e.g., DSP) that can execute fast Fourier transform (FFT) processing or the like on data captured via the AD converter 53.

The configuration shown in FIG. 1 is a schematic diagram. For example, a component such as a filter inserted between the mixer 42 of the receiving unit 40 and the video amplifier 51 of the signal processing unit 50 and a component such as a control circuit (Application Specific Integrated Circuit: ASIC) that is inserted between the microcomputer 54 and the oscillator 21 and performs control of the oscillator 21 are omitted.

In the configuration shown in FIG. 1, the video amplifier 51, the multiplexer 52, and the AD converter 53 are provided in the signal processing unit 50. However, one of the video amplifier 51, the multiplexer 52, and the AD converter 53 can be removed from the signal processing unit 50 and provided in the receiving unit 40.

A schematic operation of the radar apparatus configured as shown in FIG. 1 is explained with reference to FIG. 1. A high-frequency signal in a millimeter wave band or a microwave band generated by the oscillator 21 and amplified by the amplifier 22 is distributed by the distributor 23 and input to the amplifier 24 and the amplifier 32 of the LO-signal amplifying unit. The amplifier 24 generates a transmission signal using the high-frequency signal from the distributor 23 and transmits the transmission signal as a radar wave via the transmission antenna 12.

The radar wave (i.e., a reflected wave) transmitted from the transmission antenna 12 and reflected by a target is received by the reception antenna 14 and input to the mixer 42. The respective mixers 42 provided for the respective reception channels mix an LO signal from the amplifier 32 in a reception signal input from the reception antenna 14 to thereby generate beat signals. The beat signals are input to the video amplifier 51 in parallel for the respective reception channels, amplified and band-limited by the video amplifier 51, sequentially switched by the multiplexer 52, sampled by the A/D converter 53, and input to the microcomputer 54. The A/D converter 53 executes sampling processing on a combined output of predetermined channels selected out of the reception channels CH1 to CH8 during one modulation period of the radar wave, i.e., for each of an uplink section and a downlink section of the radar wave. The microcomputer 54 calculates, using sampling data from the A/D converter 53, for example, direction information of the target, relative distance information between an own vehicle and the target, and relative speed information of the own vehicle and the target and outputs the information to a not-shown vehicle controller or the like.

FIG. 2 is a diagram of an overview of an antenna board in the radar apparatus according to this embodiment. In FIG. 2, a plurality of antenna elements (patch antennas) formed in a rectangular shape are arranged in a predetermined pattern on an antenna board 64. These antenna elements are connected by not-shown strip lines. The strip lines are led to be combined at power feeding points of a transmission antenna and a reception antenna not shown in the figure. In FIG. 2, the shape of the antenna elements is the rectangular shape. However, antenna elements having an arbitrary shape such as a polygonal shape, a circular shape or an elliptical shape can be used.

On the antenna board 64 in this embodiment, antenna element groups (hereinafter referred to as "linear arrays") arranged at equal intervals in the vertical direction with respect to the space (a first direction: an up-down direction on the paper surface) are arranged at a predetermined interval (in the example shown in the figure, $0.7\lambda$: $\lambda$ is the wavelength of a transmission signal) in the horizontal direction (a second direction: a left-right direction on the paper surface). Among these linear arrays, four rows on the right side on the paper surface form transmission channels and the remaining twelve rows form reception channels (a reception channel group). Among the linear arrays forming the reception channel group, linear arrays of four rows in the center form reception channels CH5 to CH8 in the reception channel group with each one row set as a channel unit. On the other hand, linear arrays of eight rows on both sides (four rows on one side) among the linear arrays forming the reception channel group form reception channels CH1 to CH4 in the reception channel group with two rows set as a channel unit. In other words, outputs of linear arrays of two rows on the most left side on the paper surface are two-arrays-combined and form the reception channel CH1. Outputs of linear arrays of two rows adjacent to the reception channel CH1 (linear arrays between the reception channels CH1 and CH5) are two-arrays-combined and form the reception channel CH2. Outputs of linear arrays of two rows adjacent to the right side of the reception channel CH8 are two-arrays-combined and form the reception channel CH3. Outputs of linear arrays of two rows adjacent to the right side of the reception channel CH3 are two-arrays-combined and form the reception channel CH4. The combination of the two arrays in the reception channels CH1 to CH4 is realized on the antenna board 64. The combination of the two arrays are realized on the antenna board 64, whereby it is easy to connect the antenna board 64 and a transmitting unit circuit board and a receiving unit circuit board described later. In particular, a hole of a waveguide structure (a waveguide hole explained later) is necessary for the connection of the transmitting unit circuit board and the receiving unit circuit board. Therefore, the combination of the two arrays is realized on the antenna board 64, whereby there is an advantage that it is unnecessary to provide a plurality of waveguide holes.

In FIG. 2, as an example of this embodiment, an element interval in the horizontal direction is shown as $0.7\lambda$. However, the element interval does not need to be $0.7\lambda$. An increase in the element interval is advantageous in terms of a gain. However, because the position of first null shifts to the inner side (a 0° direction) and affects a detection distance in the front direction. Therefore, an excessively wide element interval is undesirable. Conversely, if the element interval is reduced, an antenna aperture area decreases and an antenna gain decreases. In particular, if the element interval is reduced to be equal to or smaller than $0.5\lambda$, because null due to an array factor does not occur, there is an advantage that it is unnecessary to perform null filling. However, because an antenna gain in the front direction is small and an increase in the number of antenna elements is inevitable, an excessively narrow element interval is undesirable. Therefore, the element interval in the horizontal direction is desirably in a range of ±20% ($0.56\lambda$ to $0.84\lambda$) with respect to $0.7\lambda$ set as a reference and is more desirably in a range of ±10% ($0.63\lambda$ to $0.77\lambda$).

In the reception channels configured as explained above, in the radar apparatus according to this embodiment, an array configuration for combining signals using the reception channels CH5 to CH8 (first reception channels) is defined as a reception first array and an array configuration for combining signals using all the reception channels CH1 to CH8 (second reception channels) is defined as a reception second array. As explained in detail later, in the radar apparatus according to this embodiment, processing for detecting, at a wide angle, a target at a near distance (e.g., within 10 meters) or an intermediate distance (e.g., within 60 meters) (hereinafter referred to as "wide angle middle detection processing" or abbreviated as "wide angle middle") and processing for detecting a target at a far distance (e.g., 60 meters or more) (hereinafter referred to as "long detection processing" or abbreviated as "long") are defined. The reception first array is used in the wide angle middle detection processing. The reception second array is used in the long detection processing. In other words, an antenna device applied to the radar apparatus according to this embodiment configures an array antenna for both far and near distances and is configured to switch and use two reception patterns for reception according to a detection distance of a target and share and use a part of an array antenna irrespective of a detection distance of a target.

When the reception second array is used, the signal processing unit 50 combines outputs of the reception channels CH5 and CH6 through analog signal processing or digital signal processing (for convenience of explanation, a combined reception channel is referred to as reception channel CH9) to configure linear arrays in two rows including an antenna $14_5$ and an antenna $14_6$. The signal processing unit 50 combines outputs of the reception channels CH7 and CH8 (for convenience of explanation, a combined reception channel is referred to as reception channel CH10) to configure linear arrays in two rows including an antenna $14_7$ and an antenna $14_8$. In other words, the reception second array is configured using signals of six reception channels, i.e., CH1, CH2, CH9, CH10, CH3, and CH4 formed by linear arrays obtained by combining outputs of two antennas. The signal processing unit 50 performs the long detection processing by frequency analysis explained later using reception signals (beat signals) from the combined six reception channels.

FIG. 3 is a schematic diagram of a sectional structure of the radar apparatus according to this embodiment. Specifically, an example of a sectional structure including an antenna unit, a transmitting unit, an LO-signal amplifying unit, and a receiving unit mounted on a circuit board is shown. In FIG. 3, the antenna board (see FIG. 2) on which the transmission antenna and the reception antenna are formed is bonded to a motherboard 62 using, for example, an adhesive 88. On the bonded motherboard 62, when the antenna board 64 side is set on the lower surface side, the transmitting unit 20, the LO-signal amplifying unit 30, and the receiving unit 40 are joined and arranged via BGA balls (solder balls) 76 on the upper surface side thereof.

In the transmitting unit 20, components (in FIG. 3, the amplifier 24 is shown) included in the transmitting unit 20 is arranged on the upper side of a transmitting unit circuit board 66. In the LO-signal amplifying unit 30, the amplifier 32 included in the LO-signal amplifying unit 30 is arranged on the upper side of an LO-signal amplifying unit circuit board 68. In the transmitting unit circuit board 66 and the LO-signal-amplifying unit circuit board 68, lids 72 and 74 are respectively provided to cover the components of the transmitting unit 20 and the LO-signal amplifying unit 30. The lids 72 and 74 enable hermetical sealing of high-frequency circuit components and suppression of emission and incidence of unnecessary high-frequency signals.

In the receiving unit 40, components (in FIG. 3, in addition to the mixer 42, reception circuit components such as chip resistors 84 and 86 are shown) included in the receiving unit 40 are arranged on the lower surface side (the motherboard 62 side) of a receiving unit circuit board 70. The BGA balls 76 are arranged at a predetermined interval equal to or smaller than a quarter of intra-dielectric substrate effective wavelength λ concerning a high-frequency signal processed by the receiving unit 40 and connected to a grounded conductor of the receiving unit circuit board 70 and a grounded conductor of the motherboard 62. The BGA balls 76 and the grounded conductor of the receiving unit circuit board 70 and the motherboard 62 surround the reception circuit components. As a result, the mixer 42 is covered with the receiving unit circuit board 70 and the BGA balls 76. The reception circuit components can be sealed without using lids. Electromagnetic shield of the reception circuit components is performed. There is also an effect that it is possible to reduce the influence of unnecessary waves that are likely to be emitted from the transmitting unit 20 or the LO-signal amplifying unit 30 and made incident on the receiving unit 40.

In the receiving unit 40, as in the transmitting unit 20 and the LO-signal amplifying unit 30, the components can be arranged on the upper surface side of the receiving unit circuit board 70 and lids can be provided above the components.

Electric connection of the amplifier 24 of the transmitting unit 20 and the transmission antenna is realized by a power feed pad for transmission antenna 90 provided on the antenna board 64, a coaxial signal line 94 provided in the antenna board 64 and connected to the power feed pad for transmission antenna 90, and a waveguide hole 80 provided right above the coaxial signal line 94. With this configuration, the power feed pad for transmission antenna 90 and the transmitting unit 20 are arranged side by side on a substantial straight line via a transmission line of a coaxial structure and a hole of a waveguide structure. A wiring structure is simplified. There is also an effect in a reduction of a transmission loss.

Electric connection of the mixer 42 of the receiving unit 40 and the reception antenna is realized by a power feed pad for reception antenna 92 provided on the antenna board 64, a coaxial signal line 96 provided in the antenna board 64 and connected to the power feed pad for reception antenna 92, a waveguide hole 81 provided right above the coaxial signal line 96, and a signal line 98 disposed in the receiving unit circuit board 70 and electrically connected to one end of the mixer 42. With this configuration, the power feed pad for reception antenna 92 and one end of the signal line 98 are arranged side by side on a substantial straight line via a signal transmitting unit of a coaxial structure and a signal transmitting unit of a waveguide structure. A connection structure for the antenna unit and the transmitting unit is simplified. There is also an effect in a reduction of a transmission loss.

Electric connection of the mixer 42 of the receiving unit 40 and the amplifier 32 of the LO-signal amplifying unit 30 is realized by a signal line 83 disposed in the receiving unit circuit board 70 and electrically connected to the other end of the mixer 42 and a signal line 82 disposed in the motherboard 62 and electrically connected to the amplifier 32 and the mixer 42 via the BGA balls 76. As explained above, because the connection of the transmission antenna and the transmitting unit 20 and the electric connection of the reception antenna and the receiving unit 40 are realized on both end sides of the motherboard 62, a large area (a dielectric area) is formed in the center of the motherboard 62. Therefore, because electric connection of the mixer 42 and the amplifier 32 can be performed using this area, it is possible to perform wiring design with a high degree of freedom.

As the motherboard 62, the antenna board 64, the transmitting unit circuit board 66, the LO-signal amplifying unit circuit board 68, and the receiving unit circuit board 70, various boards such as a resin board and a ceramic board excellent in a high-frequency transmission characteristic can be used. In particular, as boards mounted with high-power high-frequency circuit components such as the transmitting unit circuit board 66 and the LO-signal amplifying unit circuit board 68, a ceramic board on which a high-frequency circuit is easily designed and that is easily reduced in size is suitable. As the motherboard 62, a resin board inexpensive compared with the ceramic board is suitably used. As the antenna board 64 and the receiving unit circuit board 70, a resin board having a lower loss concerning a high-frequency signal than the motherboard 62 is suitably used. The motherboard 62, the antenna board 64, and the receiving unit circuit board 70 are formed of resin boards and integrally joined, whereby coefficients of linear expansion in joining the boards can be set close to one another. Therefore, reliability of joining against thermal stress under a heat environment in which an automobile is used is improved compared with that of the ceramic board, which is a fragile material. Consequently, because a package size of the receiving unit circuit board 70 can be increased, the receiving unit having six or more reception channels can be configured by an integrated high-frequency (in particular, millimeter wave equal to or higher than 60 GHz) package.

Figure 4:
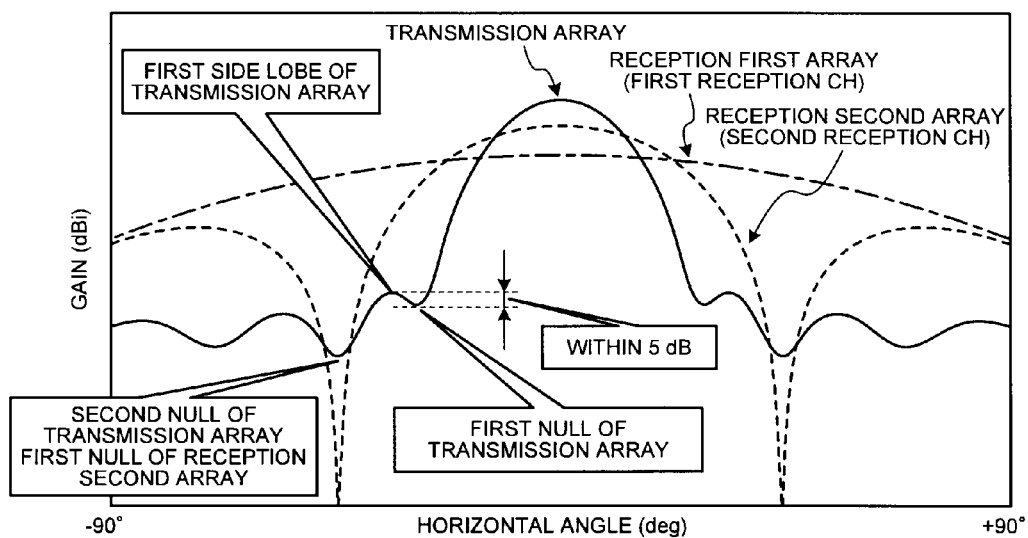
FIG. 4 is a diagram of antenna gains by a transmission antenna and a reception antenna.

Antenna gains (a transmission system and a reception system) in the radar apparatus according to this embodiment are explained. FIG. 4 is a diagram of an antenna gain by the transmission antenna (the transmission array) and an antenna gain by the reception antenna (the reception first array and the reception second array). In FIG. 4, a waveform indicated by a solid line is the antenna gain by the transmission array, a waveform indicated by an alternate long and short dash line is an antenna gain by the reception first array (the first reception channel), and a waveform indicated by a broken line is an antenna gain by the reception second array (the second reception channel).

As explained above, the antenna gain by the reception first array is an antenna gain formed by the reception channels CH5 to CH8 (the linear arrays in the four rows in the center) and used in the wide angle middle detection processing. Therefore, the antenna gain has wider angle directivity. On the other hand, the antenna gain by the reception second array is an antenna gain formed by the reception channels CH1 to CH8 (the linear arrays in the twelve rows in total obtained by combining the antennas) and used in the long detection processing. Therefore, the antenna gain has narrow directivity (a large gain and narrow reception beam width) compared with the reception first array.

The antenna gain by the transmission array is an antenna gain formed by the transmission channels (the liner arrays in the four rows on the transmission side). As shown in the figure, the antenna gain has narrower directivity than the antenna gain of the reception second array. In the antenna gain by the transmission array, second null of the transmission array and first null of the reception second array are matched. The first null of the transmission array is filled such that a gain difference between the first null of the transmission array and a first side lobe of the transmission array is within a predetermined value (e.g., 5 decibels).

A first reason for matching the second null of the transmission array and the first null of the reception second array is to secure a transmission and reception combined gain in the long detection processing. A second reason is to secure a D/U ratio in the long detection processing.

In the long detection processing, a detection area does not need to be a wide angle. Therefore, the reception second array having narrow reception beam width is used. On the other hand, because a detection distance of a target depends on a product of a gain of the transmission array and a gain of the reception array (the reception second array) (hereinafter referred to as "transmission and reception combined gain"), it is desirable to reduce the transmission and reception combined gain on the outside a detection range as much as possible. Therefore, the second null of the transmission array and the first null of the reception second array on the outside of the detection range are matched to conversely improve the transmission and reception combined gain within the detection range.

A detection area of the long detection processing is assumed to be, for example, ±20° and an angle (a direction) of the second null of the transmission array and the first null of the reception second array is assumed to be ±30°. On the other hand, when the detection area is set to, for example, ±20°, because of a characteristic of signal processing, for example, a reflection signal from a target at 30° appears as a reception signal in an angle position of about −10° (the reflection signal at 30° is returned with a position of 20° as a reference). Therefore, when a transmission and reception combined gain at 30° is large, the transmission and reception combined gain adversely affects the signal processing as a D/U ratio (Desire to Undesire ratio). Therefore, as explained above, the second null of the transmission array and the first null of the reception second array is matched.

A first reason for filling the first null of the transmission array to set the gain difference between the first null of the transmission array and the first side lobe of the transmission array within the predetermined value (e.g., 5 decibels) is to secure a transmission and reception combined gain in the wide angle middle detection processing. A second reason is to increase an angle in the wide angle middle detection processing (eliminate a blind area).

In the radar apparatus according to this embodiment, in the wide angle middle detection processing, it is a point to use a side lobe (the first side lobe) of the transmission array. A reason for using the side lobe is to secure a detection distance in a 0° direction in the long detection processing in which the transmission array is shared (when only a main lobe of the transmission array is used, a gain in the 0° direction decreases and the detection distance in the 0° direction decreases). On the other hand, when the first side lobe of the transmission array is used, a detection distance at an angle of null near the first side lobe (closer to the main lobe side than the first side lobe) decreases. Therefore, in this embodiment, gain control for the transmission antenna is performed to fill the first null of the transmission array (hereinafter referred to as "null filling").

Figure 5:
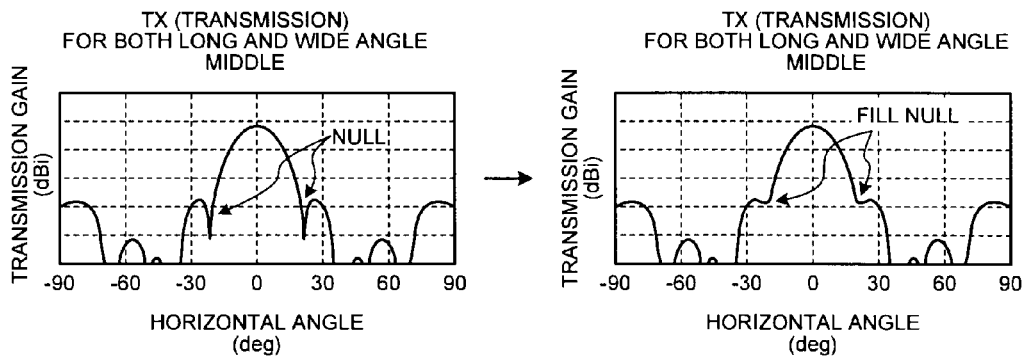
FIG. 5 is a diagram for explaining the concept of null filling.

FIG. 5 is a diagram of the concept of the null filling. In FIG. 5, the left figure is a radiation pattern obtained when the null filling is not performed and the right figure is a radiation pattern obtained when the null filling is performed. As shown in the figure, the null (the first null) present near ±20° is filled and a gain of ±20° to over ±30° is substantially flat. As a result, a transmission and reception combined gain in the wide angle middle detection processing is secured, the blind area is eliminated, and an increase in an angle can be realized.

The technology of the null filling is a publicly-known technology and disclosed in, for example, Japanese Patent Application Laid-open No. S58-118971. Therefore, detailed explanation is omitted herein.

Figure 6:
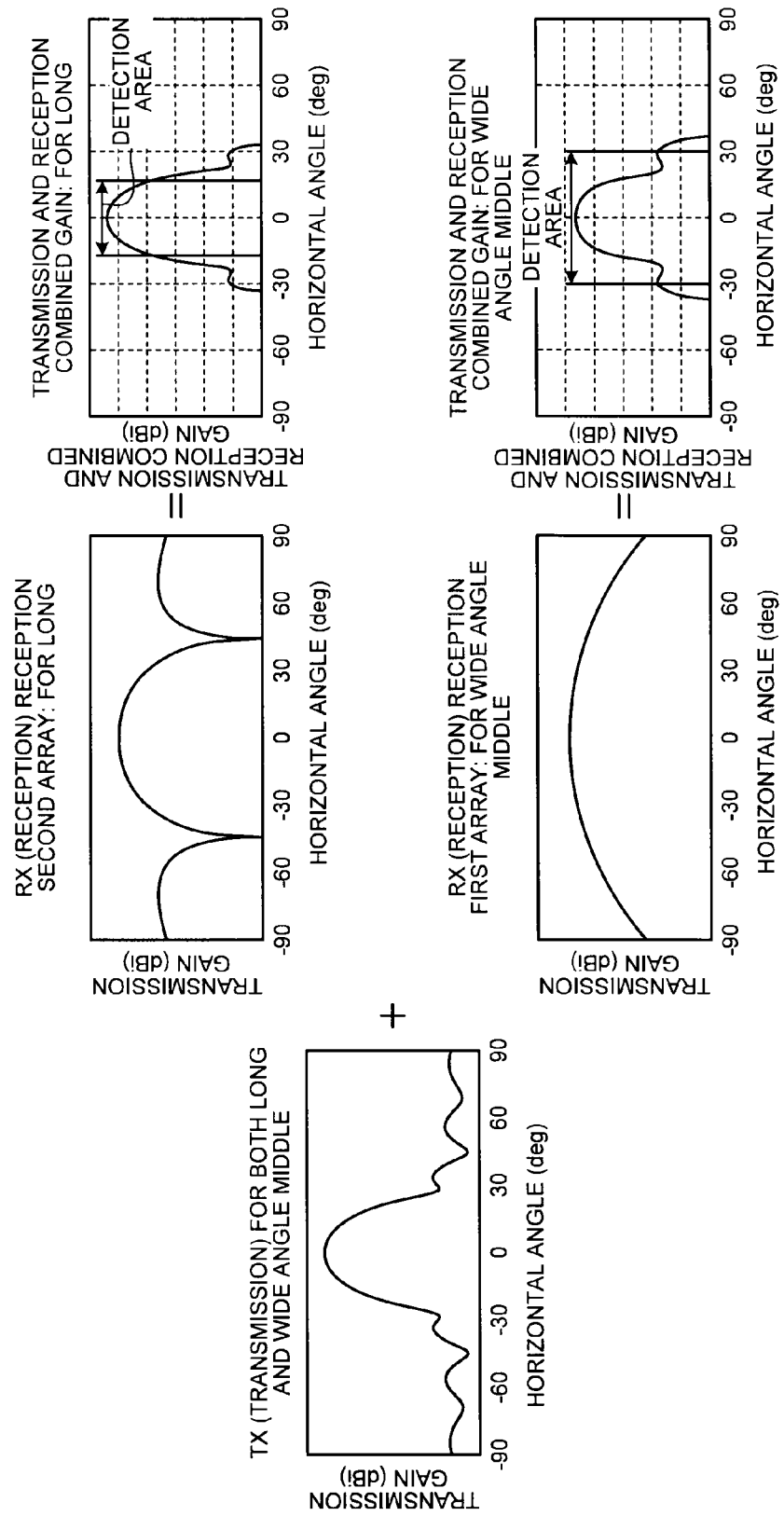
FIG. 6 is a diagram of an example of antenna gains for long and wide angle middle.

FIG. 6 is a diagram of an example of an antenna gain formed based on the concept explained above. In FIG. 6, a waveform shown in the left figure is an antenna gain (for both wide angle middle and long) of the transmission array, a waveform shown in the center upper figure is an antenna gain (for the long mode) of the reception second array, and a waveform shown in the center lower figure is an antenna gain (for wide angle middle) of the reception first array. Therefore, a transmission and reception combined gain for long is a gain sum (the right upper figure) of the waveforms shown in the left figure and the center upper figure. A transmission and reception combined gain for wide angle middle is a gain sum (the right lower figure) of the waveforms shown in the left figure and the center lower figure. As it is evident from these figures, gain switching of the long detection processing and the wide angle middle detection processing is realized by appropriately switching the reception first array and the reception second array for which array gains are appropriately set.

FIG. 7 is a diagram for explaining a transmission and reception combined gain lower limit value, null width, and minimum width of null. First, the transmission and reception combined gain lower limit value is explained. In the upper part of (a) of the figure, an example of a transmission and reception combined gain in the wide angle middle detection processing is shown. A broken line shown in the figure indicates a lower limit value of a transmission and reception combined gain (a transmission and reception combined gain lower limit value). This transmission and reception combined gain lower limit value means a gain level of the transmission and reception combined gain under which detection of a target is impossible. A signal received by the receiving unit from a more distant place is smaller. Therefore, the transmission and reception combined gain lower limit value can be defined as a transmission and reception combined gain at a maximum detection distance of the wide angle middle detection processing.

The null width is explained. In the lower part of (a) of the figure, the portion of null that occurs in a transmission and reception combined gain waveform shown in the upper part is shown. As shown in the figure, the null width can be defined as an angle (angle width) between intersections with the transmission and reception combined gain lower limit value drawn on the transmission and reception combined gain waveform. The intersection on the inner side (the 0° direction side) of the two intersections that define the null width is further defined as a "null inner side angle". This null inner side angle is a parameter that is necessary in determining "allowable null width" explained later.

The minimum width of null is explained. In (b) of the figure, the concept of the minimum width of null is shown. As explained above, in the radar apparatus according to this embodiment, a detection distance of a wide angle section (e.g., ±20° to over ±30°) in the wide angle middle detection processing is secured by performing the null filling for filling the first null of the transmission array. On the other hand, it is difficult to perform null filling for completely filling the first null. A detection distance in the 0° direction of the long detection processing is sacrificed by the null filling. On the other hand, if a target having small width (e.g., a motorbike or a bicycle) can be detected, the width of null does not need to be set smaller than the width of the target. Therefore, the null width in the transmission and reception combined gain for wide angle middle allows null equal to or smaller than the minimum width at which the small width target such as a motorbike or a bicycle is not completely included in the null width. By specifying such minimum width (allowable null width), it is possible to suppress a decrease in the detection distance in the 0° direction of the long detection processing.

Figure 8:
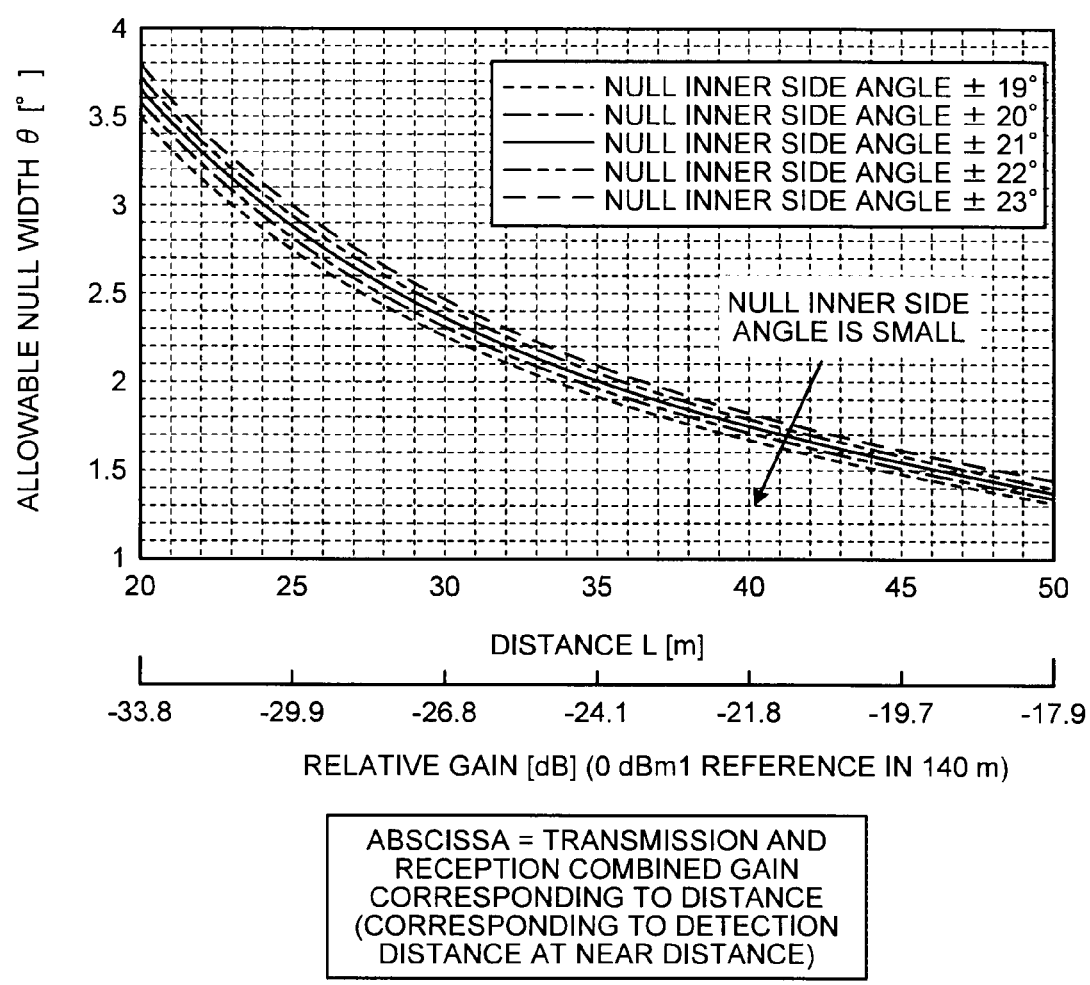
FIG. 8 is a graph of a relation between a detection distance and allowable null width.

FIG. 8 is a graph of a relation between the detection distance and the allowable null width. In FIG. 8, the abscissa indicates the distance (the detection distance) and the ordinate indicates the allowable null width. A state of changes of the distance and the allowable null width is shown using the null inner side angle as a parameter. Two points explained below are made clear from the figure.
(1) The allowable null width is smaller as the detection distance is larger.
(2) The allowable null width is smaller as an absolute value of the null inner side angle is smaller.

Therefore, the allowable null width can be determined according to a maximum detection distance in the wide angle middle detection processing and an angle position on the inner side (the null inner side angle) in the first null of the transmission array.

Figure 9:
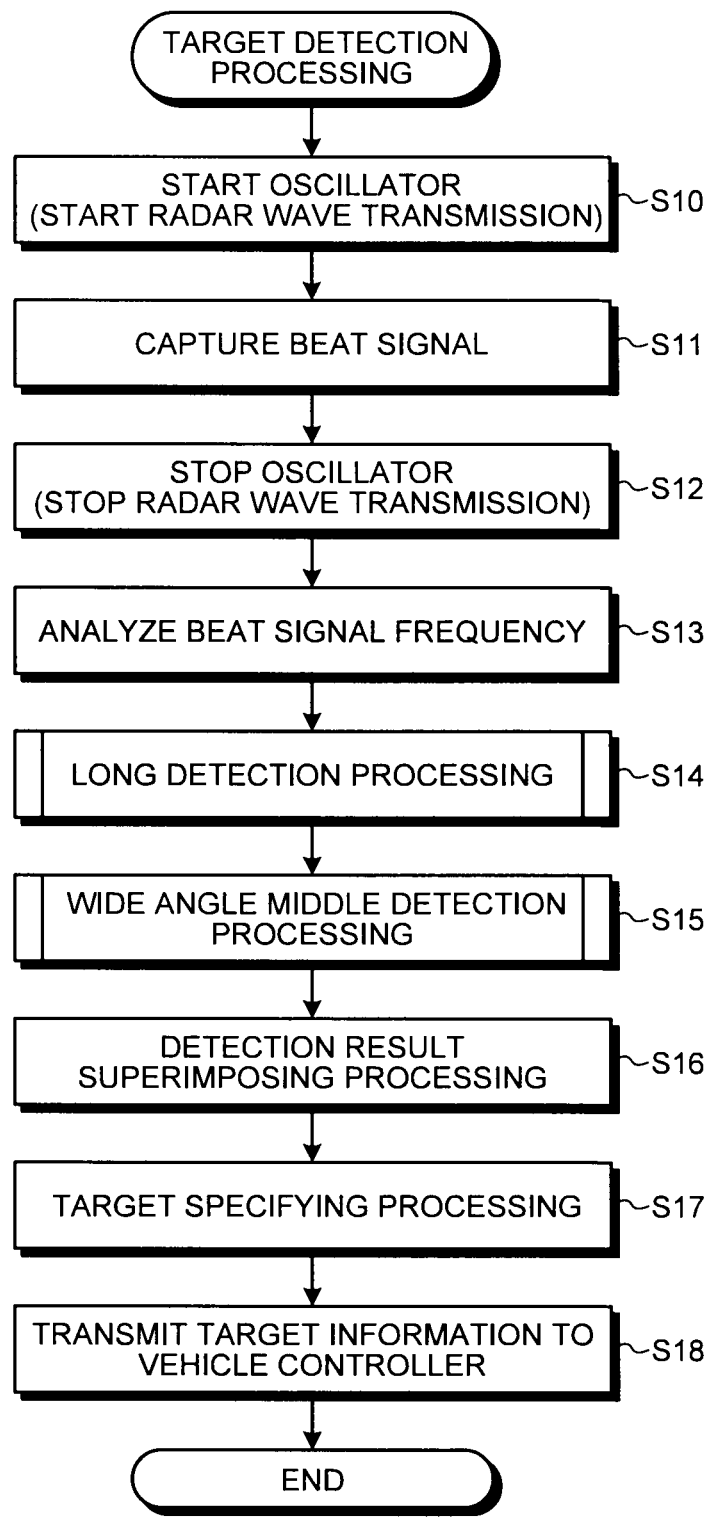
FIG. 9 is a flowchart for explaining a processing procedure of target detection processing in the embodiment.
Figure 10:
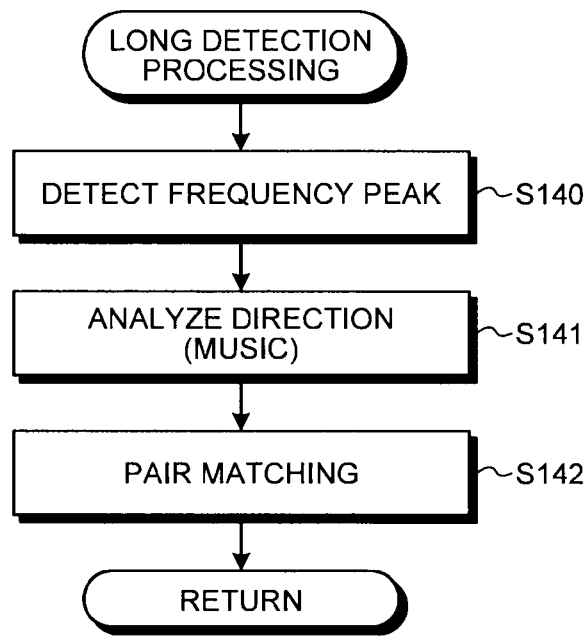
FIG. 10 is a diagram of a sub-flow of long detection processing.
Figure 11:
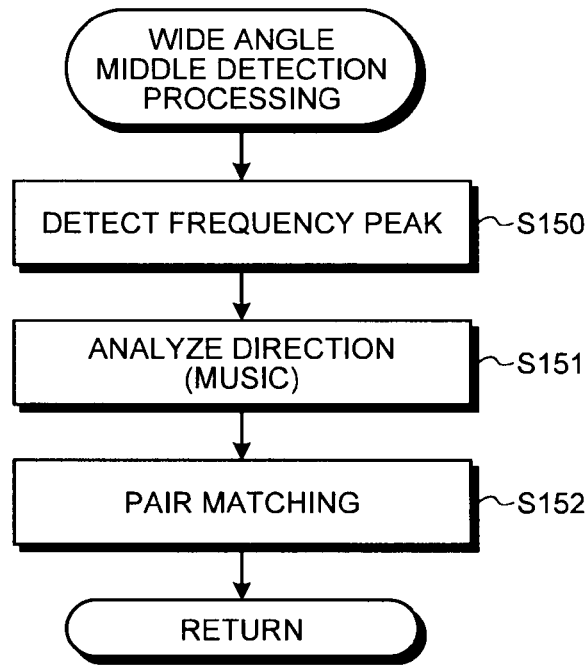
FIG. 11 is a diagram of a sub-flow of wide angle middle detection processing.

Details of target detection processing executed by the signal processing unit 50 are explained with reference to FIGS. 9 to 11. FIG. 9 is a flowchart for explaining a processing procedure of the target detection processing in this embodiment. FIGS. 10 and 11 are diagrams of sub-flows (subroutines) read out from a flow of FIG. 9. This target detection processing is started every time interval specified in advance after the start of the radar apparatus.

In FIG. 9, when the target detection processing is started, at step S10, the oscillator 21 is started and starts transmission of a radar wave. At step S11, the signal processing unit 50 acquires, via the AD converter 53, a sampling value obtained by sampling a beat signal. At the following step S12, when the signal processing unit 50 acquires a desired number of sampling values, the signal processing unit 50 stops the oscillator 21 to thereby stop the transmission of the radar wave.

At step S13, the signal processing unit 50 executes a predetermined frequency analysis (e.g., FFT processing) and calculates a power spectrum (a frequency spectrum) for each of an uplink section and a downlink section.

At the following step S14, the signal processing unit 50 executes the long detection processing. In this long detection processing, the signal processing unit 50 generates a spectrum equivalent to a result obtained by frequency-analyzing a reception signal by the reception second array (the reception channels CH1 to CH8). Processing for detecting a target is executed based on the spectrum.

Specifically, in this long detection processing, as shown in FIG. 10, at step S140, the signal processing unit 50 detects a peak frequency component (hereinafter referred to as "frequency peak") present on the spectrum calculated using the signals of the reception channels CH1 to CH8. The frequency peak detected at step S140 represents a distance to a target candidate (i.e., a likely target) that reflects the radar wave (i.e., the signal processing unit 50 detects the target candidate that reflects the radar wave).

At step S141, the signal processing unit 50 executes, based on the specific spectrum calculated at step S13, a direction analysis for estimating a direction in which the target candidate detected at step S140 is present. In this embodiment, the signal processing unit 50 executes the direction analysis using a MUSIC method for calculating, using null of the reception second array having a narrow half-value angle, a MUSIC (Multiple Signal Classification) spectrum (a peak point of the MUSIC spectrum is an index representing the direction in which the target candidate is present) from the specific spectrum.

At step S142, the signal processing unit 50 determines whether a power difference and an angle difference between a frequency peak calculated from the beat signal in the uplink section and a frequency peak calculated from the beat signal in the downlink section at step S140 are within an allowable range specified in advance. As a result of the determination, if the power difference and the angle difference between both the peaks are within the allowable range, the signal processing unit 50 executes pair matching for recognizing both the peaks as probable target candidates (hereinafter referred to as "provisional targets"). In this pair matching, concerning only the recognized provisional targets, the signal processing unit 50 generates, using a well-known method in the radar apparatus of the FM-CW system, target information according to, for example, distances to the provisional targets, relative speeds between the provisional targets and the own vehicle, and directions in which the provisional targets are present and returns to the target detection processing.

When the signal processing unit 50 returns to the target detection processing (i.e., FIG. 9), at step S15, the signal processing unit 50 executes the wide angle middle detection processing. In the wide angle middle detection processing, the signal processing unit 50 generates a spectrum equivalent to a result obtained by frequency-analyzing reception signals by the reception first array (the reception channels CH5 to CH8). Processing for detecting a target is executed based on the spectrum.

Specifically, as shown in FIG. 11, in the wide angle detection processing, at step S150, the signal processing unit 50 detects a frequency peak present on the spectrum (a spectrum for wide angle) calculated using the signals of the reception channels CH5 to CH8 (i.e., detects a target candidate).

At the following step S151, the signal processing unit 50 executes a direction analysis for estimating a direction in which the target candidate detected at step S150 is present. In this embodiment, as in the long detection processing, the signal processing unit 50 executes the direction analysis using the MUSIC method.

Further, at step S152, the signal processing unit 50 determines whether a power difference and an angle difference between a frequency peak calculated from the beat signal in the uplink section and a frequency peak calculated from the beat signal in the downlink section at step S150 are within an allowable range specified in advance. As a result of the determination, if both the peaks are within the allowable range, the signal processing unit 50 executes pair matching for recognizing both the peaks as provisional candidates.

In this wide angle middle detection processing, the signal processing unit 50 extracts a combination of frequency peaks based on a reflected wave from the same target present in a wide angle area, recognizes the combination of the frequency peaks as provisional targets, and generates target information for each of the provisional targets.

The signal processing unit 50 returns to the target detection processing (i.e., FIG. 9). At step S16, the signal processing unit 50 executes detection result superimposing processing for superimposing a result detected in the long detection processing at step S14 and a result detected in the wide angle middle detection processing at step S15.

In the following step S17, the signal processing unit 50 determines whether histories of the provisional targets detected in the present measurement cycle (hereinafter referred to as "present cycle targets") and provisional targets detected in the last and preceding measurement cycles (hereinafter referred to as "last cycle targets") can be connected by a specified number of times specified in advance or more. If the histories can be connected, the signal processing unit 50 executes well-known target specifying processing for recognizing the provisional targets, the histories of which can be connected, as decided targets (i.e., likely targets).

Specifically, in the target specifying processing in this embodiment, the signal processing unit 50 estimates a combination of the present cycle targets and the last cycle targets, extracts any one of the combined targets (hereinafter referred to as "corresponding candidates"), and calculates, based on target information corresponding to the last cycle targets among the extracted corresponding candidates, predicted positions and predicted speeds (hereinafter referred to as "predicted values") of the present cycle targets corresponding to the last cycle targets. The signal processing unit 50 calculates a position difference and a speed difference between the corresponding candidates based on the predicted values and positions and speeds calculated from the present cycle targets in the corresponding candidates. Only when the position difference is smaller than an upper limit position difference set in advance and the speed difference is smaller than an upper limit speed difference set in advance, the signal processing unit 50 determines that the corresponding candidates have history connection.

Further, in this target specifying processing, processing for giving a probability indicating possibility of being a target to the decided targets according to, for example, the number of times histories can be connected and processing for specifying and segmenting a leading vehicle and a roadside object (e.g., a guardrail) based on relative speeds to the decided targets and the positions of the decided targets are executed.

At step S18, the signal processing unit 50 transmits target information of the decided targets recognized at step S17 to a predetermined vehicle controller and ends the target detection processing (i.e., ends the present cycle).

The configuration and the operation of the radar apparatus according to this embodiment are explained and the details of the target detection processing, which is a principal part of the radar apparatus according to the present invention, are explained above. As explained above, the radar apparatus according to this embodiment adopts the configuration in which the mixers are provided for the respective reception channels and simultaneous reception of required channels (hereinafter referred to as "direct simultaneous reception") can be performed without switching the sub-arrays (the channels) (hereinafter referred to as "direct simultaneous reception system"). Therefore, the radar apparatus according to this embodiment can perform further improvement concerning frequency resolution and high-frequency noise.

Figure 12:
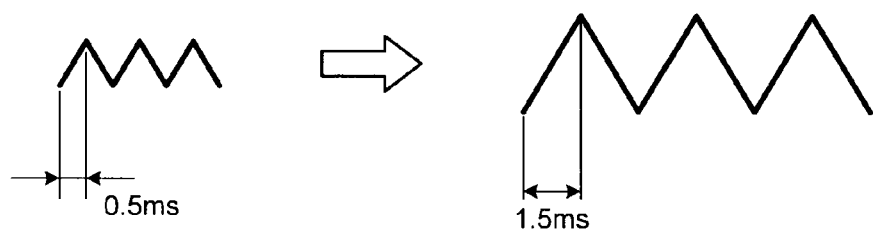
FIG. 12 is a diagram for explaining the concept of expansion of frequency modulation width.

FIG. 12 is a diagram for explaining the concept of expansion of frequency modulation width, which is one of performance improvement methods in the radar apparatus according to this embodiment. Typical frequency modulation width in the radar apparatus in the past is, for example, 0.5 millisecond as shown on the left side of the figure. On the other hand, the frequency modulation width of the radar apparatus according to this embodiment is, for example, 1.5 milliseconds, which is three times as long as that of the radar apparatus in the past. By performing such expansion of the frequency modulation width, two effects are obtained. One effect is that a large number of sampling points of a beat signal can be acquired and frequency resolution is improved, i.e., resolution of a detection distance is improved. The other effect is that resolution band width decreases, which is effective in a reduction of high-frequency noise.

Figure 13:
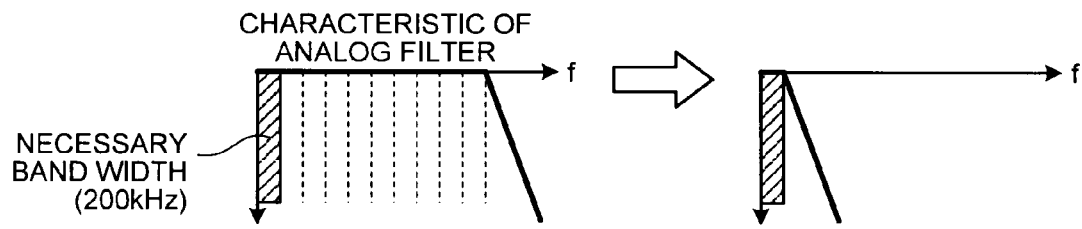
FIG. 13 is a diagram for explaining the concept of narrowing of a filter band width.

FIG. 13 is a diagram for explaining the concept of narrowing of a filer band, which is another one of the performance improvement methods in the radar apparatus according to this embodiment. In the radar apparatus in the past that does not adopt the direct simultaneous reception system, one mixer down-converts signals of a plurality of channels. Therefore, as a characteristic of an analog filter of a typical radar apparatus, for example, a filter characteristic equivalent to 200 kHz× the number of channels is necessary. On the other hand, in the radar apparatus according to this embodiment, because the direct simultaneous reception system is adopted, it is possible to narrow down bands of the filters (see FIG. 1) provided for the respective channels (narrowing of bands). In other words, in the radar apparatus according to this embodiment, it is possible to set the bands of the filters for the respective channels to, for example, 200 kilohertz. As a result, in the radar apparatus according to this embodiment, there is an effect that it is possible to reduce high-frequency noise and an SN ratio is improved.

As explained above, with the radar apparatus according to this embodiment, in the transmission antenna, one transmission array is shared irrespective of a detection distance of a target. In the reception antenna, the two reception arrays for reception (the reception first array and the reception second array) are switched and used according to a detection distance of a target. On the other hand, these two reception arrays are configured to share and use a part of antennas (sub-arrays). Because a switch or the like is not used for switching of the reception first array and the reception second array, switching of the reception first array and the reception second array is instantaneously performed. Both the reception first array and the reception second array are configured to be capable of simultaneously receiving required channels without switching sub-arrays (channels) that form the two reception arrays.

Therefore, with the radar apparatus according to this embodiment, it is possible to quickly perform target detection at the wide angle area that is an angle range wider than the normal angle range (the target detection is realized in the wide angle middle detection processing) while keeping on enabling detection of a target present in a position away from a vehicle (i.e., while maintaining target detection performance in a far distance area (the target detection is realized in the long detection processing). As a result, with the radar apparatus according to this embodiment, for example, it is possible to realize both earlier detection of a cutting-in vehicle suddenly appearing in front of the own vehicle and detection of an accurate position of a target present at a far distance.

Moreover, in the radar apparatus according to this embodiment, the detection is realized by defining a combination of the antenna elements or the sub-arrays without changing an arrangement interval of the antenna elements included in the array antenna or adding antenna elements.

Therefore, in the antenna unit applied to the radar apparatus according to this embodiment, compared with the antenna unit applied to the radar apparatus in the past it is possible to realize the functions explained above without increasing an antenna area (an aperture area).

With the radar apparatus according to this embodiment, the second null of the radiation pattern by the transmission array and the first null of the reception pattern by the reception second array are matched (do not need to be completely matched). Therefore, it is possible to secure a transmission and reception combined gain in the long detection processing and secure a D/U ratio in the long detection processing.

With the radar apparatus according to this embodiment, for an increase in an angle in the wide angle middle detection processing, the form of using the first side lobe of the radiation pattern by the transmission array is adopted. When the first side lobe is used, the first null of the transmission array is filled using the method of null filling. Therefore, it is possible to eliminate a blind area in the wide angle middle detection processing while securing a transmission and reception combined gain in the wide angle middle detection processing.

With the radar apparatus according to this embodiment, when the null filling for filling the first null of the transmission array is performed, a gain difference between the first null of the transmission array and the first side lobe of the transmission array is set to be within the predetermined value (e.g., within 5 decibels). Therefore, it is possible to increase an angle in the wide angle middle detection processing without substantially affecting detection performance of the long detection processing.

With the radar apparatus according to this embodiment, concerning the connection of the antenna board and the transmission circuit board, the antenna board side is the coaxial structure and the transmission circuit board side is the waveguide structure and these structure sections are arranged side by side on a substantially straight line. Therefore, there is an effect that the connection structure of the antenna unit and the transmitting unit is simplified and a coupling loss of the antenna unit and the transmitting unit is reduced.

With the radar apparatus according to this embodiment, concerning the connection of the antenna board and the reception circuit board, the antenna board side is the coaxial structure and the reception circuit board side is the waveguide structure and these structure sections are arranged side by side on a substantially straight line. Therefore, there is an effect that the connection structure of the antenna unit and the receiving unit is simplified and a coupling loss of the antenna unit and the receiving unit is reduced.

In the transmitting unit applied to the radar apparatus according to this embodiment, after the circuit components are mounted on the individual circuit board, the lids and the balls are attached to the transmitting unit to package the transmitting unit. Therefore, there is an effect that it is easy to mount the transmitting unit on the motherboard and it is also easy to connect the transmitting unit to the antenna board.

In the receiving unit applied to the radar apparatus according to this embodiment, after the circuit components are mounted on the lower surface side of the individual circuit board, the balls are attached to the receiving unit to package the receiving unit. Therefore, there is an effect that it is easy to mount the receiving unit on the motherboard, it is easy to connect the receiving unit to the antenna board, and it is possible to hermetically seal the receiving unit without providing lids. In the receiving unit, as in the transmitting unit, the components can be arranged on the upper surface side of the receiving unit circuit board and the lids can be provided above the components. In this case, the same effects can be obtained.

In the radar apparatus according to this embodiment, among the circuit components of the transmission system, after the LO-signal amplifying unit that distributes an LO signal to the mixer of the receiving unit is mounted on the circuit board separate from the other circuit components of the transmitting unit, the lids and the balls are attached to the transmitting unit to package the transmitting unit. Therefore, even after a transmission package and a reception package having a small degree of freedom of arrangement are arranged because of limitations with the antenna circuit board, there is an effect that connection to the mixer of the reception package can be easily performed using a free space of the motherboard.

In the radar apparatus according to this embodiment, the direct simultaneous reception system for enabling simultaneous reception of required channels without switching the sub-arrays (the channels) is adopted. Therefore, there is an effect that frequency resolution is improved and high-frequency noise is reduced.

In the radar apparatus according to this embodiment, the bands of the filters can be narrowed by adopting the direct simultaneous reception system. Therefore, there is an effect that it is possible to reduce high-frequency noise and improve an SN ratio.

The embodiment of the radar apparatus according to the present invention is explained above. However, the present invention is not limited to the embodiment and can be carried out in various manners without departing from the spirit of the present invention.

For example, in the arrays of the antenna elements according to the embodiment, the arrays are the linear arrays arranged at equal intervals in the vertical direction. However, the arrays are not limited to the linear arrays arranged at equal intervals. The linear arrays can be arranged at unequal intervals.

For example, in the arrays of the reception arrays according to the embodiment, the reception first array (for both wide angle middle and long) is configured using the linear arrays in the four rows in the center. However, the linear arrays are not limited to the four rows in the center and can be three rows in the center or five rows in the center. The liner arrays do not always need to be provided in the center. The reception first array can be formed using the liner arrays in four rows on the left side or four rows on the right side. The linear array in each one row does not have to be the array configuration and can be configured as a single antenna element.

In the embodiment, the processing for detecting, at a wide angle, a target at a near distance or an intermediate distance is classified as the wide angle middle detection processing and the processing for detecting a target at a far distance is classified as the long detection processing. However, these classifications merely indicate an example. In the present invention, processing for detecting a target present in an area at a distance closer to a set distance set in advance and an angle wider than a set angle set in advance (a first detection area) only has to be classified as the wide angle middle detection processing and processing for detecting a target present in an area at a distance farther than the set distance set in advance and on the inner side of the set angle set in advance (a second detection area) only has to be classified as the long detection processing.

In the target detection processing in the embodiment, MUSIC is used as the method of a direction analysis. However, the method of a direction analysis is not limited to this. For example, the direction analysis can be performed using DBF (Digital Beam Forming).

The present invention can be applied to various radar apparatuses such as a pre-crush safety system (so-called PCS), an adaptive cruise control system (so-called ACC), forward collision warning (so-called FCW), and lane change warning (so-called LCW).

INDUSTRIAL APPLICABILITY

As explained above, the present invention is useful as a radar apparatus and an antenna device that make it possible to detect, in a wider angle range in addition to a normal detection area, a direction in which a target is present without increasing the area of a reception antenna.

REFERENCE SIGNS LIST

10 ANTENNA UNIT
12 TRANSMISSION ANTENNA
14 RECEPTION ANTENNA
20 TRANSMITTING UNIT
21 OSCILLATOR
22, 24, 32 AMPLIFIERS
23 DISTRIBUTOR
30 LO-SIGNAL AMPLIFYING UNIT
40 RECEIVING UNIT
42 MIXER
44 LO-SIGNAL DISTRIBUTION CIRCUIT
46, 82, 83, 98 SIGNAL LINES
50 SIGNAL PROCESSING UNIT
51 VIDEO AMPLIFIER
52 MULTIPLEXER
53 AD CONVERTER
54 MICROCOMPUTER
62 MOTHERBOARD
64 ANTENNA BOARD
66 TRANSMITTING-UNIT CIRCUIT BOARD
68 LO-SIGNAL AMPLIFYING UNIT CIRCUIT BOARD
70 RECEIVING-UNIT CIRCUIT BOARD
72, 74 LIDS
76 BGA BALLS
80, 81 WAVEGUIDE HOLES
84, 86 CHIP RESISTORS
88 ADHESIVE
90 POWER FEED PAD FOR TRANSMISSION ANTENNA
92 POWER FEED PAD FOR RECEPTION ANTENNA
94, 96 COAXIAL SIGNAL LINES

The invention claimed is:

1. A radar apparatus comprising:
a transmitting unit that generates a probe wave including a continuous wave;
an antenna unit including a transmission antenna that radiates the probe wave to a space and a reception antenna that receives a reflected wave from a target of the probe wave;
a receiving unit that outputs a signal obtained by down-converting a reception signal from the reception antenna into a predetermined frequency band; and
a signal processing unit that applies a predetermined frequency analysis to the signal output from the receiving unit and outputs information concerning one or more of a distance to the target, a relative speed to the target, and a direction in which the target is present, wherein
when a detection area of the target is classified into a first detection area that is an area at a distance closer than a set distance set in advance and at an angle wider than a set angle set in advance and a second detection area that is an area at a distance farther than the set distance and on an inner side of the set angle,
the reception antenna includes a plurality of antennas for reception as array antennas and, in the reception antenna, a reception first array that probes the first detection area using a predetermined number of antennas adjacent to one another among the plurality of antennas for reception and a reception second array that probes the second detection area using all the antennas are configured,
the transmission antenna is shared as an antenna for probe of the first and second detection areas,
second null of a radiation pattern by the transmission antenna and first null of a reception pattern by the reception second array are substantially matched, and
a level difference between a first side lobe of the radiation pattern of the transmission antenna and first null of the radiation pattern is within a predetermined value.

2. The radar apparatus according to claim 1, wherein the first side lobe of the radiation pattern of the transmission antenna is included in the first detection area and is not included in the second detection area.

3. The radar apparatus according to claim 2, wherein
the transmission antenna includes a plurality of antennas for transmission as array antennas and, in the transmission antenna, a transmission array that irradiates the probe wave to the first and second detection areas using all the antennas for transmission is configured, and
the transmission antenna is mounted on a same antenna board together with the reception antenna.

4. The radar apparatus according to claim 1, wherein, after circuit components included in the transmitting unit are mounted on a separate transmission circuit board, the transmitting unit is attached with lids and balls to be packaged and is mounted on a motherboard to which an antenna board mounted with the transmission antenna and the reception antenna is joined.

5. The radar apparatus according to claim 4, wherein, after circuit components included in the receiving unit are mounted on a separate reception circuit board, the receiving unit is attached with lids and balls to be packaged and is mounted on the motherboard.

6. The radar apparatus according to claim 4, wherein, after circuit components included in the receiving unit are mounted on a separate circuit board, the receiving unit is attached with balls on the circuit components side to be packaged and is mounted on the motherboard.

7. The radar apparatus according to claim 5, wherein the antenna board side is a coaxial structure and the transmission circuit board side is a waveguide structure and these structure sections are arranged side by side on a substantially straight line via a waveguide hole provided in the motherboard.

8. The radar apparatus according to claim 5, wherein the antenna board side is a coaxial structure and the transmission circuit board side is a waveguide structure and these structure sections are arranged side by side on a substantially straight line via a waveguide hole provided in the motherboard.

9. The radar apparatus according to claim 1, wherein, in the receiving unit, one reception channel is configured for each of the antennas included in the reception antenna, a mixer is arranged for the each reception channel, and a plurality of the mixers are arranged such that a sum of signal electric length between an amplifier that amplifies a local signal power-supplying to the mixers and the mixer corresponding to the amplifier and signal electric length between the reception antenna and the mixer corresponding to the reception antenna is substantially the same.

10. The radar apparatus according to claim 1, wherein an interval in a horizontal direction among the antennas included in the reception second array is set to between 0.56 times to 0.84 times of wavelength of the probe wave.

11. The radar apparatus according to claim 1, wherein the level difference between the first null and the first side lobe is within 5 decibels.

12. The radar apparatus according to claim 1, wherein minimum width of the first null is set based on a target having small width among targets to be detected.

13. The radar apparatus according to claim 4, wherein an interval in a horizontal direction among the antennas included in the transmission array is set to a same degree as an interval in the horizontal direction among the antennas included in the reception second array.

14. The radar apparatus according to claim 4, wherein the antennas included in the transmission array and the reception array are linear arrays arranged at equal intervals in a vertical direction.

15. The radar apparatus according to claim 6, wherein the antenna board side is a coaxial structure and the transmission circuit board side is a waveguide structure and these structure sections are arranged side by side on a substantially straight line via a waveguide hole provided in the motherboard.

16. The radar apparatus according to claim 6, wherein the antenna board side is a coaxial structure and the transmission circuit board side is a waveguide structure and these structure sections are arranged side by side on a substantially straight line via a waveguide hole provided in the motherboard.

17. The radar apparatus according to claim 9, wherein an interval in a horizontal direction among the antennas included in the transmission array is set to a same degree as an interval in the horizontal direction among the antennas included in the reception second array.

18. The radar apparatus according to claim 10, wherein an interval in a horizontal direction among the antennas included in the transmission array is set to a same degree as an interval in the horizontal direction among the antennas included in the reception second array.

19. The radar apparatus according to claim 11, wherein an interval in a horizontal direction among the antennas included in the transmission array is set to a same degree as an interval in the horizontal direction among the antennas included in the reception second array.

20. The radar apparatus according to claim 12, wherein an interval in a horizontal direction among the antennas included in the transmission array is set to a same degree as an interval in the horizontal direction among the antennas included in the reception second array.

21. The radar apparatus according to claim 9, wherein the antennas included in the transmission array and the reception array are linear arrays arranged at equal intervals in a vertical direction.

22. The radar apparatus according to claim 10, wherein the antennas included in the transmission array and the reception array are linear arrays arranged at equal intervals in a vertical direction.

23. The radar apparatus according to claim 11, wherein the antennas included in the transmission array and the reception array are linear arrays arranged at equal intervals in a vertical direction.

24. The radar apparatus according to claim 12, wherein the antennas included in the transmission array and the reception array are linear arrays arranged at equal intervals in a vertical direction.

25. An antenna device comprising:
a transmission antenna in which a plurality of antenna element groups having a plurality of antenna elements for transmission arrayed in a first direction are arrayed in a second direction orthogonal to the first direction; and
a reception antenna in which a plurality of antenna element groups having a plurality of antenna elements for reception arrayed in the first direction are arrayed in the second direction,
the antenna device being applied to a radar apparatus that performs, based on a reception signal of the reception antenna that receives a reflected wave from a target of a probe wave radiated from the transmission antenna to a space, detection processing for the target, wherein
a reception first array that probes, using a predetermined number of antennas adjacent to one another among the antenna element groups for reception, a first detection area that is an area at a distance closer than a set distance set in advance and at an angle wider than a set angle set in advance, and a reception second array that probes, using all the antenna element groups, a second detection area that is an area at a distance farther than the set distance and on an inner side of the set angle are configured in the reception antenna, the transmission antenna is shared as an antenna for probe of the first and second detection areas, and power is fed to the transmission antenna such that second null of a radiation pattern by the transmission antenna and first null of a reception pattern by the reception second array are substantially matched and a level difference between a first side lobe of the radiation pattern of the transmission antenna and first null of the radiation pattern is within a predetermined value.

* * * * *